(12) United States Patent
Alsina et al.

(10) Patent No.: US 8,983,905 B2
(45) Date of Patent: Mar. 17, 2015

(54) MERGING PLAYLISTS FROM MULTIPLE SOURCES

(75) Inventors: Thomas Alsina, Mountain View, CA (US); Andrew Wadycki, San Mateo, CA (US); Arvind S. Shenoy, San Jose, CA (US); David K. Heller, Los Altos, CA (US); Jeffrey L. Robbin, Los Altos, CA (US); Patrice Olivier Gautier, San Francisco, CA (US); Payam Mirrashidi, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/366,248

(22) Filed: Feb. 3, 2012

(65) Prior Publication Data
US 2013/0086003 A1 Apr. 4, 2013

Related U.S. Application Data

(60) Provisional application No. 61/542,375, filed on Oct. 3, 2011.

(51) Int. Cl.
*G06F 17/30* (2006.01)
(52) U.S. Cl.
CPC .... *G06F 17/30053* (2013.01); *G06F 17/30578* (2013.01)
USPC .......................................... 707/610
(58) Field of Classification Search
USPC .......................................... 707/610
See application file for complete search history.

(56) References Cited

U.S. PATENT DOCUMENTS

| 4,996,642 | A | 2/1991 | Hey |
| 5,355,302 | A | 10/1994 | Martin |
| 5,375,235 | A | 12/1994 | Berry et al. |
| 5,464,946 | A | 11/1995 | Lewis |
| 5,483,278 | A | 1/1996 | Strubbe |
| 5,583,763 | A | 12/1996 | Atcheson et al. |

(Continued)

FOREIGN PATENT DOCUMENTS

| EP | 1050833 | 8/2000 |
| EP | 1231788 | 8/2002 |

(Continued)

OTHER PUBLICATIONS

Canada—Examiner's Report for App. No. 2713507 mailed on Sep. 21, 2011.

(Continued)

*Primary Examiner* — Jorge A Casanova
*Assistant Examiner* — William Spieler
(74) *Attorney, Agent, or Firm* — Novak Druce Connolly Bove + Quigg LLP

(57) ABSTRACT

The present technology resolves playlist version conflicts resulting from modifications made to a playlist version, stored on a client device and in a cloud locker, when the client device and the cloud locker are in a disconnected state. The present technology is a heuristic for determining how to resolve such version conflicts. Upon reconnection of the client and cloud locker, the server, associated with cloud locker attempts to reconcile any version discrepancies resulting from user-initiated changes. In one embodiment, when the server determines that one of the playlists on the client or server is a superset of the other, the superset is selected and saved to both the client and cloud locker, while the subset version is deleted.

20 Claims, 10 Drawing Sheets

(56) References Cited

U.S. PATENT DOCUMENTS

| | | |
|---|---|---|
| 5,724,521 A | 3/1998 | Dedrick |
| 5,754,939 A | 5/1998 | Herz |
| 5,758,257 A | 5/1998 | Herz |
| 5,765,144 A | 6/1998 | Larche |
| 5,890,152 A | 3/1999 | Rapaport |
| 5,918,014 A | 6/1999 | Robinson |
| 5,926,624 A | 7/1999 | Katz et al. |
| 5,950,176 A | 9/1999 | Keiser |
| 6,000,044 A | 12/1999 | Chrysos et al. |
| 6,041,311 A | 3/2000 | Chislenko et al. |
| 6,047,311 A | 4/2000 | Ueno et al. |
| 6,112,186 A | 8/2000 | Bergh et al. |
| 6,134,532 A | 10/2000 | Lazarus et al. |
| 6,345,288 B1 | 2/2002 | Reed |
| 6,346,951 B1 | 2/2002 | Mastronardi |
| 6,347,313 B1 | 2/2002 | Ma |
| 6,349,339 B1 | 2/2002 | Williams |
| 6,381,575 B1 | 4/2002 | Martin et al. |
| 6,430,539 B1 | 8/2002 | Lazarus et al. |
| 6,434,621 B1 | 8/2002 | Pezzillo |
| 6,438,579 B1 | 8/2002 | Hosken |
| 6,457,018 B1 | 9/2002 | Rubin |
| 6,487,539 B1 | 11/2002 | Aggarwal et al. |
| 6,526,411 B1 | 2/2003 | Ward |
| 6,532,469 B1 | 3/2003 | Feldman et al. |
| 6,577,716 B1 | 6/2003 | Minter |
| 6,587,127 B1 | 7/2003 | Leeke et al. |
| 6,615,208 B1 | 9/2003 | Behrens et al. |
| 6,647,371 B2 | 11/2003 | Shinohara |
| 6,687,696 B2 | 2/2004 | Hofmann et al. |
| 6,690,918 B2 | 2/2004 | Evans et al. |
| 6,704,576 B1 | 3/2004 | Brachman et al. |
| 6,727,914 B1 | 4/2004 | Gutta |
| 6,748,395 B1 | 6/2004 | Picker et al. |
| 6,751,574 B2 | 6/2004 | Shinohara |
| 6,785,688 B2 | 8/2004 | Abajian et al. |
| 6,842,761 B2 | 1/2005 | Diamond et al. |
| 6,850,252 B1 | 2/2005 | Hoffberg |
| 6,914,891 B2 | 7/2005 | Ha et al. |
| 6,931,454 B2 | 8/2005 | Deshpande et al. |
| 6,933,433 B1 | 8/2005 | Porteus |
| 6,941,324 B2 | 9/2005 | Plastina |
| 6,947,922 B1 | 9/2005 | Glance |
| 6,950,804 B2 | 9/2005 | Strietzel |
| 6,987,221 B2 | 1/2006 | Platt |
| 6,990,497 B2 | 1/2006 | O'Rourke et al. |
| 6,993,532 B1 | 1/2006 | Platt et al. |
| 7,013,238 B1 | 3/2006 | Weare |
| 7,020,637 B2 | 3/2006 | Bratton |
| 7,021,836 B2 | 4/2006 | Anderson et al. |
| 7,043,479 B2 | 5/2006 | Ireton |
| 7,051,352 B1 | 5/2006 | Schaffer |
| 7,072,846 B1 | 7/2006 | Robinson |
| 7,082,407 B1 | 7/2006 | Bezos et al. |
| 7,096,234 B2 | 8/2006 | Plastina |
| 7,111,240 B2 | 9/2006 | Crow |
| 7,113,917 B2 | 9/2006 | Jacobi |
| 7,113,999 B2 | 9/2006 | Pestoni et al. |
| 7,120,619 B2 | 10/2006 | Drucker et al. |
| 7,127,143 B2 | 10/2006 | Elkins, II et al. |
| 7,136,866 B2 | 11/2006 | Springer, Jr. |
| 7,139,723 B2 | 11/2006 | Conkwright |
| 7,174,126 B2 | 2/2007 | McElahtten |
| 7,180,473 B2 | 2/2007 | Horie |
| 7,194,421 B2 | 3/2007 | Conkwright |
| 7,196,258 B2 | 3/2007 | Platt |
| 7,197,472 B2 | 3/2007 | Conkwright |
| 7,224,282 B2 | 5/2007 | Terauchi et al. |
| 7,236,941 B2 | 6/2007 | Conkwright |
| 7,246,041 B2 | 7/2007 | Fukuda |
| 7,256,341 B2 | 8/2007 | Plastina |
| 7,277,870 B2 | 10/2007 | Mourad et al. |
| 7,302,419 B2 | 11/2007 | Conkwright |
| 7,302,468 B2 | 11/2007 | Wijeratne |
| 7,358,434 B2 | 4/2008 | Plastina |
| 7,363,314 B2 | 4/2008 | Picker et al. |
| 7,392,212 B2 | 6/2008 | Hancock |
| 7,403,769 B2 | 7/2008 | Kopra |
| 7,415,181 B2 | 8/2008 | Greenwood |
| 7,434,247 B2 | 10/2008 | Dudkiewicz et al. |
| 7,457,852 B2 | 11/2008 | O'Rourke et al. |
| 7,457,862 B2 | 11/2008 | Hepworth et al. |
| 7,478,323 B2 | 1/2009 | Dowdy |
| 7,487,107 B2 | 2/2009 | Blanchard et al. |
| 7,490,775 B2 | 2/2009 | Biderman |
| 7,493,572 B2 | 2/2009 | Card et al. |
| 7,499,630 B2 | 3/2009 | Koch et al. |
| 7,505,959 B2 | 3/2009 | Kaiser et al. |
| 7,546,254 B2 | 6/2009 | Bednarek |
| 7,568,213 B2 | 7/2009 | Carhart et al. |
| 7,571,121 B2 | 8/2009 | Bezos |
| 7,571,183 B2 | 8/2009 | Renshaw et al. |
| 7,574,422 B2 | 8/2009 | Guan et al. |
| 7,574,513 B2 | 8/2009 | Dunning et al. |
| 7,580,932 B2 | 8/2009 | Plastina et al. |
| 7,599,847 B2 | 10/2009 | Block et al. |
| 7,599,906 B2 | 10/2009 | Kashiwagi |
| 7,599,950 B2 | 10/2009 | Walther et al. |
| 7,644,077 B2 | 1/2010 | Picker et al. |
| 7,647,613 B2 | 1/2010 | Drakoulis |
| 7,650,570 B2 | 1/2010 | Torrens et al. |
| 7,657,224 B2 | 2/2010 | Goldberg et al. |
| 7,657,493 B2 | 2/2010 | Meijer |
| 7,680,849 B2 | 3/2010 | Heller |
| 7,680,959 B2 | 3/2010 | Svendsen |
| 7,685,204 B2 | 3/2010 | Rogers |
| 7,693,887 B2 | 4/2010 | McLaughlin |
| 7,707,603 B2 | 4/2010 | Abanami |
| 7,720,871 B2 | 5/2010 | Rogers et al. |
| 7,725,494 B2 | 5/2010 | Rogers et al. |
| 7,734,569 B2 | 6/2010 | Martin |
| 7,743,009 B2 | 6/2010 | Hangartner |
| 7,797,321 B2 | 9/2010 | Martin |
| 7,797,446 B2 | 9/2010 | Heller et al. |
| 7,826,444 B2 | 11/2010 | Irvin |
| 7,831,199 B2 | 11/2010 | Ng |
| 7,840,570 B2 | 11/2010 | Martin Cervera et al. |
| 7,853,712 B2 | 12/2010 | Amidon et al. |
| 7,875,788 B2 | 1/2011 | Benyamin |
| 7,889,724 B2 | 2/2011 | Irvin |
| 8,260,656 B1 | 9/2012 | Harbick et al. |
| 2001/0007099 A1 | 7/2001 | Rau |
| 2001/0021914 A1 | 9/2001 | Jacobi et al. |
| 2001/0056434 A1 | 12/2001 | Kaplan et al. |
| 2002/0002899 A1 | 1/2002 | Gjerdingen |
| 2002/0042912 A1 | 4/2002 | Iijima et al. |
| 2002/0059094 A1 | 5/2002 | Hosea et al. |
| 2002/0082901 A1 | 6/2002 | Dunning et al. |
| 2002/0087970 A1 | 7/2002 | Dorricott et al. |
| 2002/0152117 A1 | 10/2002 | Christofalo et al. |
| 2002/0164973 A1* | 11/2002 | Janik et al. .................. 455/403 |
| 2002/0178223 A1 | 11/2002 | Bushkin |
| 2002/0178276 A1 | 11/2002 | McCartney et al. |
| 2002/0194215 A1 | 12/2002 | Cantrell et al. |
| 2002/0194309 A1* | 12/2002 | Carter et al. .................. 709/219 |
| 2003/0022953 A1 | 1/2003 | Zampini et al. |
| 2003/0033321 A1 | 2/2003 | Schrempp et al. |
| 2003/0055689 A1 | 3/2003 | Block |
| 2003/0097379 A1 | 5/2003 | Ireton |
| 2003/0120630 A1 | 6/2003 | Tunkelang |
| 2003/0182254 A1 | 9/2003 | Plastina et al. |
| 2003/0212710 A1 | 11/2003 | Guy |
| 2003/0229537 A1 | 12/2003 | Dunning et al. |
| 2004/0002993 A1 | 1/2004 | Toussaint et al. |
| 2004/0003392 A1 | 1/2004 | Trajkovic et al. |
| 2004/0068552 A1 | 4/2004 | Kotz et al. |
| 2004/0070538 A1 | 4/2004 | Horie et al. |
| 2004/0073924 A1 | 4/2004 | Pendakur |
| 2004/0128286 A1 | 7/2004 | Yasushi et al. |
| 2004/0139064 A1 | 7/2004 | Chevallier et al. |
| 2004/0148424 A1 | 7/2004 | Berkson et al. |
| 2004/0158860 A1 | 8/2004 | Crow |
| 2004/0162738 A1 | 8/2004 | Sanders et al. |
| 2004/0194128 A1 | 9/2004 | McIntyre |

(56) References Cited

U.S. PATENT DOCUMENTS

| | | |
|---|---|---|
| 2004/0215657 A1 | 10/2004 | Drucker et al. |
| 2004/0263337 A1 | 12/2004 | Terauchi et al. |
| 2004/0267715 A1 | 12/2004 | Polson et al. |
| 2005/0005246 A1 | 1/2005 | Card et al. |
| 2005/0021470 A1 | 1/2005 | Martin et al. |
| 2005/0050079 A1 | 3/2005 | Plastina et al. |
| 2005/0060350 A1 | 3/2005 | Baum et al. |
| 2005/0075908 A1 | 4/2005 | Stevens |
| 2005/0091146 A1 | 4/2005 | Levinson |
| 2005/0102610 A1 | 5/2005 | Jie |
| 2005/0114357 A1 | 5/2005 | Chengalvarayan et al. |
| 2005/0131752 A1 | 6/2005 | Gracie |
| 2005/0141709 A1 | 6/2005 | Bratton |
| 2005/0154608 A1 | 7/2005 | Paulson et al. |
| 2005/0160458 A1 | 7/2005 | Baumgartner |
| 2005/0193014 A1 | 9/2005 | Prince |
| 2005/0193054 A1 | 9/2005 | Wilson et al. |
| 2005/0195696 A1 | 9/2005 | Rekimoto |
| 2005/0198075 A1 | 9/2005 | Plastina et al. |
| 2005/0203807 A1 | 9/2005 | Bezos et al. |
| 2005/0210009 A1 | 9/2005 | Tran |
| 2005/0210101 A1 | 9/2005 | Janik |
| 2005/0216855 A1 | 9/2005 | Kopra et al. |
| 2005/0216859 A1 | 9/2005 | Paek et al. |
| 2005/0222989 A1 | 10/2005 | Haveliwala et al. |
| 2005/0223039 A1 | 10/2005 | Kim et al. |
| 2005/0234891 A1 | 10/2005 | Walther et al. |
| 2005/0235811 A1 | 10/2005 | Dukane |
| 2005/0251440 A1 | 11/2005 | Bednarek |
| 2005/0256867 A1 | 11/2005 | Walther et al. |
| 2005/0276570 A1 | 12/2005 | Reed et al. |
| 2006/0015571 A1 | 1/2006 | Fukuda et al. |
| 2006/0015904 A1 | 1/2006 | Marcus |
| 2006/0018208 A1 | 1/2006 | Nathan et al. |
| 2006/0018209 A1 | 1/2006 | Drakoulis et al. |
| 2006/0020062 A1 | 1/2006 | Bloom |
| 2006/0020662 A1 | 1/2006 | Robinson |
| 2006/0026263 A1 | 2/2006 | Raghaven et al. |
| 2006/0031288 A1 | 2/2006 | Ter Horst et al. |
| 2006/0032363 A1 | 2/2006 | Platt |
| 2006/0053077 A1 | 3/2006 | Mourad |
| 2006/0062094 A1 | 3/2006 | Nathan et al. |
| 2006/0067296 A1 | 3/2006 | Bershad |
| 2006/0074750 A1 | 4/2006 | Clark et al. |
| 2006/0080251 A1 | 4/2006 | Fried |
| 2006/0080356 A1 | 4/2006 | Burges et al. |
| 2006/0091203 A1 | 5/2006 | Bakker et al. |
| 2006/0095516 A1 | 5/2006 | Wijeratne |
| 2006/0100978 A1 | 5/2006 | Heller |
| 2006/0112098 A1 | 5/2006 | Renshaw et al. |
| 2006/0123052 A1 | 6/2006 | Robbin et al. |
| 2006/0136344 A1 | 6/2006 | Jones et al. |
| 2006/0143236 A1 | 6/2006 | Wu |
| 2006/0156239 A1 | 7/2006 | Jobs et al. |
| 2006/0165571 A1 | 7/2006 | Seon et al. |
| 2006/0168616 A1 | 7/2006 | Candelore |
| 2006/0173910 A1 | 8/2006 | McLaughlin |
| 2006/0173916 A1 | 8/2006 | Verbeck Sibley et al. |
| 2006/0174008 A1 | 8/2006 | Abanami |
| 2006/0195462 A1 | 8/2006 | Rogers |
| 2006/0195512 A1 | 8/2006 | Rogers et al. |
| 2006/0195513 A1 | 8/2006 | Rogers et al. |
| 2006/0195514 A1 | 8/2006 | Rogers et al. |
| 2006/0195515 A1 | 8/2006 | Beaupre et al. |
| 2006/0195516 A1 | 8/2006 | Beaupre |
| 2006/0195521 A1 | 8/2006 | New et al. |
| 2006/0195581 A1 | 8/2006 | Vaman et al. |
| 2006/0195789 A1 | 8/2006 | Rogers |
| 2006/0195790 A1 | 8/2006 | Beaupre |
| 2006/0206478 A1 | 9/2006 | Glaser |
| 2006/0253874 A1 | 11/2006 | Stark et al. |
| 2006/0265421 A1 | 11/2006 | Ranasinghe et al. |
| 2006/0277098 A1 | 12/2006 | Chung et al. |
| 2006/0282304 A1 | 12/2006 | Bedard et al. |
| 2006/0282311 A1 | 12/2006 | Jiang |
| 2006/0288044 A1 | 12/2006 | Kashiwagi et al. |
| 2006/0288367 A1 | 12/2006 | Swix et al. |
| 2007/0016507 A1 | 1/2007 | Tzara |
| 2007/0043829 A1 | 2/2007 | Dua |
| 2007/0073596 A1 | 3/2007 | Alexander et al. |
| 2007/0100690 A1 | 5/2007 | Hopkins |
| 2007/0101373 A1 | 5/2007 | Bodlanender et al. |
| 2007/0118546 A1 | 5/2007 | Acharya |
| 2007/0136264 A1 | 6/2007 | Tran |
| 2007/0156677 A1 | 7/2007 | Szabo |
| 2007/0156732 A1 | 7/2007 | Surendran et al. |
| 2007/0161402 A1 | 7/2007 | Ng |
| 2007/0162546 A1 | 7/2007 | McLaughlin |
| 2007/0203790 A1 | 8/2007 | Torrens et al. |
| 2007/0244880 A1 | 10/2007 | Martin et al. |
| 2007/0250429 A1 | 10/2007 | Walser |
| 2007/0250761 A1 | 10/2007 | Bradley et al. |
| 2007/0265979 A1 | 11/2007 | Hangartner |
| 2007/0271286 A1 | 11/2007 | Purang |
| 2007/0271287 A1 | 11/2007 | Acharya et al. |
| 2007/0282848 A1* | 12/2007 | Kiilerich et al. ............... 707/10 |
| 2007/0294096 A1 | 12/2007 | Randall |
| 2008/0004948 A1 | 1/2008 | Flake |
| 2008/0004990 A1 | 1/2008 | Flake |
| 2008/0021851 A1 | 1/2008 | Alcalde |
| 2008/0027881 A1 | 1/2008 | Bisse |
| 2008/0040326 A1 | 2/2008 | Chang et al. |
| 2008/0046317 A1 | 2/2008 | Christianson |
| 2008/0065659 A1 | 3/2008 | Watanabe et al. |
| 2008/0077264 A1 | 3/2008 | Irvin et al. |
| 2008/0082467 A1 | 4/2008 | Meijer et al. |
| 2008/0109378 A1 | 5/2008 | Papadimitriou |
| 2008/0120339 A1 | 5/2008 | Guan et al. |
| 2008/0133601 A1 | 6/2008 | Cervera et al. |
| 2008/0154942 A1 | 6/2008 | Tsai et al. |
| 2008/0155057 A1 | 6/2008 | Khedouri et al. |
| 2008/0155588 A1 | 6/2008 | Roberts et al. |
| 2008/0195438 A1 | 8/2008 | Manfredi |
| 2008/0215173 A1 | 9/2008 | Hicken |
| 2008/0218409 A1 | 9/2008 | Moinzadeh et al. |
| 2008/0220855 A1 | 9/2008 | Chen et al. |
| 2008/0256106 A1 | 10/2008 | Whitman |
| 2008/0256378 A1 | 10/2008 | Guillorit |
| 2008/0270221 A1 | 10/2008 | Clemens et al. |
| 2009/0006353 A1 | 1/2009 | Vignoli |
| 2009/0024504 A1 | 1/2009 | Lerman et al. |
| 2009/0024510 A1 | 1/2009 | Chen et al. |
| 2009/0048957 A1 | 2/2009 | Celano |
| 2009/0049030 A1 | 2/2009 | Svendsen et al. |
| 2009/0059512 A1 | 3/2009 | Lydon et al. |
| 2009/0070267 A9 | 3/2009 | Hangartner |
| 2009/0073174 A1 | 3/2009 | Berg et al. |
| 2009/0076939 A1 | 3/2009 | Berg et al. |
| 2009/0076974 A1 | 3/2009 | Berg et al. |
| 2009/0083307 A1 | 3/2009 | Cervera et al. |
| 2009/0089222 A1 | 4/2009 | Ferreira de Castro et al. |
| 2009/0106085 A1 | 4/2009 | Raimbeault |
| 2009/0125526 A1* | 5/2009 | Neufeld ............... 707/10 |
| 2009/0164641 A1 | 6/2009 | Rogers |
| 2009/0210415 A1 | 8/2009 | Martin et al. |
| 2009/0276368 A1 | 11/2009 | Martin et al. |
| 2009/0282093 A1 | 11/2009 | Allard et al. |
| 2010/0161595 A1 | 6/2010 | Martin et al. |
| 2010/0169328 A1 | 7/2010 | Hangartner |
| 2011/0087603 A1 | 4/2011 | Garcia et al. |
| 2011/0119127 A1 | 5/2011 | Hangartner |

FOREIGN PATENT DOCUMENTS

| | | |
|---|---|---|
| EP | 1420388 | 5/2004 |
| EP | 1548741 | 6/2005 |
| JP | 11-052965 | 2/1999 |
| JP | 2002-108351 | 4/2002 |
| JP | 2002-320203 | 10/2002 |
| JP | 2003-255958 | 9/2003 |
| JP | 2004-221999 | 8/2004 |
| JP | 2005-027337 | 1/2005 |
| KR | 2002025579 | 4/2002 |
| WO | 03/036541 | 5/2003 |

(56) References Cited

FOREIGN PATENT DOCUMENTS

| WO | 03/051051 | 6/2003 |
|---|---|---|
| WO | 2004/070538 | 8/2004 |
| WO | 2005/013114 | 2/2005 |
| WO | 2005/115107 | 12/2005 |
| WO | 2006/052837 | 5/2006 |
| WO | 2006/075032 | 7/2006 |
| WO | 2006/034218 | 8/2006 |
| WO | 2006/114451 | 11/2006 |
| WO | 2007/038806 | 4/2007 |
| WO | 2007/075622 | 7/2007 |
| WO | 2007/092053 | 8/2007 |
| WO | 2007/134193 | 11/2007 |
| WO | 2009/149046 | 12/2009 |

OTHER PUBLICATIONS

IEEE, no matched results, Nov. 11, 2009, 1 page.
Industry Standard, The, Help FAQs for Standard Prediction Market, http://www.thestandard.com/help, downloaded Jun. 29, 2009.
PCTfES2005f00003 Written Opinion of the International Preliminary Examining Authority dated Mar. 19, 2007.
PCTfES2005f00003 Written Opinion of the International Searching Authority Report dated Jun. 10, 2005.
PCTfES2005f000213 International Preliminary Report on Patentability (Ch II) Report Dated Nov. 15, 2007.
UK Search Examination Report, App. No. GB1014954.0, mailed Dec. 16, 2010.
www.akoo.com/Akoo/, Web Page, Akoo, Pick the Music, Waiting in the line at the Theme Park, Introducing the m-Venue™ platform.
www.ecastinc.com/music_licensing.html, Web Page, Ecast Network, interactive entertainment network, Music/ Licensing.
www.roweinternational.com/jukeboxes_dia.html, Web Page, Digital Internet Access Jukeboxes, Rowe International.
www.touchtunes.com, Web Page, Touchtunes, Turn your Rowe 100A's and 100B's into touch tunes Digital Jukeboxes—Bose.
PCT/US2006/048330; International Bureau; PCT Search Report and Written Opinion; Mar. 20, 2008; 10 pages, Mar. 20, 2008, 10 pages.
"Communications of the ACM" Dec. 1992, vol. 35, No. 12 at pp. 26-28 (Introduction to special issue regarding Workshop on High Performance Information Filtering, Morristown, N.J. Nov. 1991), Dec. 1992, 26-28.
"Apple: iTunes 4.2 User Guide for Windows", Apple: iTunes 4.2 User Guide for Windows; Dec. 2003; retrieved from the internet: URL: http://www2.austin.cc.tx. us/tcm/projects/itunes.pdf; pp. 10, 17-19. (Added Ref Nov. 5, 2009), Dec. 2003, 10,17-19.
"Architecting Personalized Delivery of Multimedia Information", "Architecting Personalized Delivery of Multimedia Information", Communications of the ACM (Dec. 1992).
"Communication from the Examining Division dated Jul. 22, 2011", European Patent Application No. 09169573.4 (8 pages).
"Digital Music Sales Triple to $1.1 Billion in 2005", Maintenance Fees, Feb. 24, 2006, Axcessnews.com,, available online www.axcessnews.com/modules/wfsection/article.php?articleid=8327, last viewed Feb. 24, 2006.
"Final Office Action dated Jan. 1, 2012", U.S. Appl. No. 12/242,728 (15 pages).
"Final Office Action dated Nov. 10, 2011", U.S. Appl. No. 12/242,768 (10 pages).
"International Search Report and Written Opinion", for PCT application No. PCT/US2012/057660, 28 pages, dated Jan. 7, 2013.
"Lessons from LyricTimeTM: A Prototype Multimedia System", "Lessons from LyricTimeTM: A Prototype Multimedia System" 4th IEEE ComSoc International Workshop on Multimedia Communications (Apr. 1992).
"New Music Recommendation System is Based on FOAF Personal Profiling", "New Music Recommendation System is Based on FOAF Personal Profiling," www.masternewmedia.org/music_recommendation/music_recommendation_system_FOAF, Oct. 1, 2005.
"Non-Final Office Action dated Feb. 16, 2012", U.S. Appl. No. 12/242,758.
"Non-Final Office Action dated Feb. 9, 2012", U.S. Appl. No. 12/646,916 (13 pages).
"Non-Final Office Action dated Jan. 9, 2012", U.S. Appl. No. 12/242,735 (12 pages).
"Not Your Average Jukebox", www.alwayson-network.com/comments.php?id=P12663 0 37 0 C, Web Page, Not Your Average Jukebox, on Hollywood 1000 contender Ecast uses broadbank to being the digital media experience to your watering hole. Posted Nov. 4, 2005.
"PCT International Preliminary Report on Patentability (Ch II) dated May 22, 2007", PCT Application No. PCT/ES2005/00003, May 22, 2007.
"PCT International Search Report and Written Opinion dated Nov. 8, 2010", PCT Application No. PCT/US2010/47955, (16 pages).
"PCT International Search Report and Written Opinion dated Dec. 7, 2007", PCT Application No. PCT/US2007/068708, Dec. 7, 2007, (6 pages).
"PCT International Search Report and Written Opinion dated Feb. 17, 2010", PCT Application No. PCT/US09/068604, Feb. 17, 2010.
"PCT International Search Report and Written Opinion dated May 28, 2008", PCT Application No. PCT/US2006/003795, May 28, 2008.
"PCT International Search Report and Written Opinion dated Jun. 5, 2009", PCT Application No. PCT/US09/42002, Jun. 5, 2009.
"PCT International Search Report and Written Opinion dated Jul. 15, 2009", PCT Application No. PCT/US2009/45911, Jul. 15, 2009.
"PCT International Search Report dated Oct. 23, 2009", PCT Application No. PCT/US2006/004257, Oct. 23, 2009.
"PCT International Search Report dated Feb. 9, 2007", PCT Application No. PCT/US2006/034218, Feb. 9, 2007, (3 pages).
"PCT International Search Report dated Mar. 25, 2008", PCT Application No. PCT/US2006/38769, Mar. 25, 2008, (3 pages).
"PCT International Search Report dated Jul. 15, 2009", PCT Application No. PCT/US2009/45725, Jul. 15, 2009.
"PCT International Search Report Dated Sep. 4, 2009", PCT Application No. PCT/US2009/051233, Sep. 4, 2009.
"PCT International Written Opinion dated Aug. 10, 2008", PCT Application No. PCT/US2006/034218, Aug. 10, 2008, (5 pages).
"PCT Written Opinion of the International Searching Authority dated Jan. 12, 2006", PCT Application No. PCT/ES2005/000213, Jan. 12, 2006.
"RFID Brings Messages to Seattle Sidewalks", www.rfidjournal.comfarticle/articleview/1619/1/1, Web Page, RFID brings messages to Seattle side walks on RFID system being deployed next week will send marketing and assistive information to users carrying active RFID tags. RFID Journal (pp. 1-4), May 26, 2004, 1-4.
"Social Networking Meets Music Listening: Mecora Launches Radio 2.0", www.masternewmedia.org/news/2006/04/13/ social_networking_meets_music_listening.htm, Apr. 13, 2006.
"TouchTunes Signs License Agreement for BMI Music in Digital Jukeboxes", www.bmi.com/news/200403/20040324b.asp, Web Page, BMI™ Figures Don't Lie, Mar. 24, 2004, Touch Tunes Signs License Agreement for BMI Music in Digital Jukeboxes., Mar. 24, 2004.
"Treemap", Treemap, University of Maryland, http://www.cs.umd.edu/hcil/treemap/, last updated Aug. 5, 2003, 4 pages, Aug. 5, 2003, 4 pages.
"Variations 2", The Trustees of Indiana University, Variations 2, The Indiana University Digital Music Library, http://dml.indiana.edu/, last updated May 11,2005, 1 page, May 11, 2005, 1 page.
Alvear, Jose, "Risk-Free Trial Streaming Media Delivery Tools", Alvear, Jose, "Risk-Free Trial Streaming Media Delivery Tools," Streaming Media.com; www.streamingmedia.com/ article.ap?id=5768, Jun. 30, 2000.
Baluja, S, et al., "Video Suggestion and Discovery for YouTube: Taking Random Walks through the View Graph", Baluja, S., Seth, R., Sivakumar, D., Jing, Y., Yagnik, J., Kumar, S., Ravichandran, D., and Aly, M. "Video Suggestion and Discovery for YouTube: Taking Random Walks Through the View Graph". In WWW '08: Proceedings of the 17th International conference o, 2008, 895-904.

(56) References Cited

OTHER PUBLICATIONS

Belkins, et al., "Information Filtering and Information Retrieval: Two Sides of the Same Coin?", Belkins, et al., "Information Filtering and Information Retrieval: Two Sides of the Same Coin?", Communications of the ACM (Dec. 1992).

Bender, "Twenty Years of Personalization: All about the Daily Me", Bender, "Twenty Years of Personalization: All about the Daily Me," Educause Review (Sep./Oct. 2002), 2002.

Bender, et al., "Newspace: Mass Media and Personal Computing", Bender, et al., "Newspace: Mass Media and Personal Computing," Proceedings of USENIX, Conference, pp. 329-348(Summer 1991)., 1991, 329-348.

Bollen, Johan et al., "Toward alternative metrics of journal impact: a comparison of download and citation data", Toward alternative metrics of journal impact: a comparison of download and citation data, Johan Bollen, Herbert Van de Sompel, Joan Smith, Rick Luce, Google.com, 2005, pp. 1-2, 2005, 1-2.

Bunzel, Tom, "Easy Digital Music", Tom Bunzel, "Easy Digital Music," QUE Publisher, Aug. 18, 2004, Chapters 5 and 8., Aug. 18, 2004, chapters 5 and 8.

Cano, Pedro et al., "On the Use of FastMap for Audio Retrieval and Browsing", Cano, Pedro et al., The International Conference on Music Information Retrieval and Related Activities (ISMIR 2002), Paris, France, Oct. 2002,2 pages, 2002.

Carlson, et al., "Internet Banking Market Developments and Regulatory Issues in the New Economy: What Changed, and the Challenges for Economic Policy . . .", Carlson et al., May 2001, http://www.occ.gov/netbank/SGEC2000.pdf, May 2001, 33 pages.

Chao-Ming, et al., "Design and Evaluation and mProducer: a Mobile Authoring Tool for Personal Experience Computing", Chao-Ming et al. (Chao-Ming), Design and Evaluation and mProducer: a Mobile Authoring Tool for Personal Experience Computing [online], MUM 2004, College Park, Maryland, USA, Oct. 27-29, 2004 [retrieved on Dec. 17, 2010]. [http://citeseerx.ist.psu.edu/vie, [http://citeseerx.ist.psu.edu/viewdoc/download?doi=10.1.1.131.2933&rep=rep1&type=pdf],Oct. 27-29, 2004.

Connell, Lain et al., "Ontological Sketch Models: Highlighting User-System Misfits", Connell, lain et al., Ontological Sketch Models: Highlighting User-System Misfits, in P. Palanque, E. O'Neill and P. Johnson, editors, Proceedings of Human Computer Interaction (HCI) Bath, England, Sep. 2003, London Springer, pp. 1-16, Sep. 2003, 1-16.

Das, A et al., "Google News Personalization: Scalable Online Collaborative Filtering", Das,A., Datar,M., Garg,A., and Rajaram,S. "Google News Personalization: Scalable Online Collaborative Filtering". In WWW '07: Proceedings of the 16th international conference on World Wide Web, pp. 271-280, New York, NY, D USA, 2007. ACM Press, 2007, 271-280.

Dean, J et al., "MapReduce: Simplied Data Processing on Large Clusters", Dean, J. and Ghemawat, S. "MapReduce: Simplied Data Processing on Large Clusters". Commun. ACM, 51(1):107-113, 2008, 107-113.

Dempster, Y, "Maximum Likelihood from Incomplete Data via the EM Algorithm", Dempster, Y., Laird, N., and Rubin, D. "Maximum Likelihood from Incomplete Data via the EM Algorithm". Jour. of the Royal Stat. Soc., Ser. B., 39:1047-1053,1977, 1047-1053.

Deshpande, Mukund et al., "Item-Based Top-N Recommendation Algorithms", Deshpande, Mukund, et al., "Item-Based Top-N Recommendation Algorithms," ACM Transactions on Information Systems, 22:1 (Jan. 2004), pp. 143-177, Jan. 2004, 143-177.

Hofmann, T, "Latent Semantic Models for Collaborative Filtering", Hofmann, T. "Latent Semantic Models for Collaborative Filtering". ACM Transactions on Information Systems, 22:89-115, 2004, 89-115.

Hofmann, T, "Unsupervised Learning by Probabilistic Latent Semantic Analysis", Hofmann, T. "Unsupervised Learning by Probabilistic Latent Semantic Analysis". Mach. Learn., 42:177-196, 2001, 177-196.

Indyk, P et al., "Low-Distortion Embeddings of Finite Metric Spaces", Indyk, P. and Matousek, J. "Low-Distortion Embeddings of Finite Metric Spaces". In Handbook of Discrete and Computational Geometry, pp. 177-196. CRC Press, 2004, 177-196.

Jacucci, Giulio et al., "IP City, Integrated Project on Interaction and Presence on Urban Environments—Demonstrators on Large-Scale Events Applications", IP City, Integrated Project on Interaction and Presence on Urban Environments—Demonstrators on Large-Scale Events Applications; ipcity.eu; Giulio Jacucci, John Evans, Tommi Ilmonen; pp. 1-37; Feb. 9, 2007, 1-37.

Lazar, N A., "Bayesian Empirical Likelihood", N.A. Lazar; Bayesian Empirical Likelihood; Technical Report, Carnegie Mellon University, Department of Statistics, 2000; 26 pages., 2000.

Lie, "The Electronic Broadsheet—All the News That Fits the Display", Lie, "The Electronic Broadsheet—All the News That Fits the Display," MIT Master's Thesis, pp. 1-96 (Jun. 1991), 1-96.

Lippman, et al., "News and Movies in the 50 Megabit Living Room", Lippman, et al., "News and Movies in the 50 Megabit Living Room," IEEE/IEICE, Global Telecommunications Conference, pp. 1976-1981 (Nov. 15, 1987), 1976-1981.

Loeb, Shoshana, "Delivering Interactive Multimedia Documents over Networks", Delivering Interactive Multimedia Documents over Networks; Shoshana Loeb; IEEE Communications Magazine; May 1992; 8 pages, May 1992.

Logan, Beth, "A Music Similarity Function Based on Signal Analysis", Logan, Beth et al., A Music Similarity Function Based on Signal Analysis, IEEE International Conference on Multimedia and Expo (ICME), Tokyo, Japan, Aug. 2001, IEEE Press, pp. 952-955, Aug. 2001, 952-955.

Logan, Beth, "Content-Based Playlist Generation: Exploratory Experiments", Logan, Beth, Content-Based Playlist Generation: Exploratory Experiments, The International Conference on Music Information Retrieval and Related Activities (ISMIR 2002), Paris, France, Oct. 2002, 2 pages, Oct. 2002.

Maidin, Donncha et al., "The Best of Two Worlds: Retrieving and Browsing", Maidin, Donncha 0 et al., The Best of Two Worlds: Retrieving and Browsing, Proceedings of the COST G-6 Conference on Digital Audio Effects (DAFX-OO), Verona, Italy, Dec. 7-9, 2000,4 pages, Dec. 2000.

McCarthy, et al., "Augmenting the Social Space of an Academic Conference", Augmenting the Social Space of an Academic Conference; McCarthy, et al. Information School, University of Washington and Department of Computer Science and Engineering, University of Minnesota; pp. 1-10; Nov. 6-10, 2004, Nov. 2004, 1-10.

NA, Australia Examiner's 1st Report on patent application No. 2010212503 mailed Jun. 27, 2011.

NA, EP Search, App. No. EP 10175868.8, mailed.

Notess, Mark et al., Notess, Mark et al., Variations2: Toward Visual Interface for Digital Music Libraries, Second International Workshop on Visual Interfaces to Digital Libraries, 2002, 6 pages, 2002.

O'Connor, M et al., "PolyLens: A Recommender System for Groups of Users", PolyLens: A Recommender System for Groups of Users; M. O'Connor, D. Cosley, J.A. Konstan, J. Riedl; European Conference on Computer Supported Co-Operative Work at Bonn, Germany; Published 2001; pp. 199-218, 2001, 199-218.

Orwant, J, "Appraising the User of User Models: Doppelganger's Interface", Jon Orwant, "Appraising the User of User Models: Doppelganger's Interface," in: A. Kobsa and D. Litman (eds.), Proceeding of the 4th International Conference on User Modeling (1994).

Orwant, Jonathon L., "Doppelganger Goes to School: Machine Learning for User Modeling", Jonathan L. Orwant, "Doppelganger Goes to School: Machine Learning for User Modeling," MIT Master of Science Thesis (Sep. 1993).

Orwant, Jonathon L., "Doppelganger: A User Modeling System", Jonathan L. Orwant, "Doppelganger: A User Modeling System," MIT Bachelor's Thesis (Jun. 1991).

Pachet, Francois et al., "A Taxonomy of Musical Genres, Content-Based Multimedia Information Access Conference (RIAO)", Pachet, Francois, A Taxonomy of Musical Genres, Content-Based Multimedia Information Access Conference (RIAO), Paris, Apr. 2000, 8 pages, Apr. 2000.

Paek, Tim et al., "Toward University Mobile Interaction for Shared Displays", Toward University Mobile Interaction for Shared Displays; Tim Paek, et al.; Microsoft Research, Redmond, WA; pp. 1-4;

(56) References Cited

OTHER PUBLICATIONS

Nov. 6-10, 2004. Retrieved from the internet: <URL: http://research.microsoft.com/-timpaekiPapers/cscw2004. pdf> entire document, Nov. 2004, 1-4.

Pampalk, Elias et al., "Content-based Organization and Visualization of Music Archives", Pampalk, Elias et al., Content-based Organization and Visualization of Music Archives, ACM Multimedia, Juan les Pins, France, Dec. 2002, pp. 570-579., Dec. 2002, 570-579.

Pauws, Steffen et al., "PATS: Realization and User Evaluation of an Automatic Playlist Generator", Pauws, Steffen et al., PATS: Realization and User Evaluation of an Automatic Playlist Generator, The International Conferences on Music Information Retrieval and Related Activities (ISMIR 2002), Paris, France, Oct. 2002, 9 pages, Oct. 2002.

Platt, John C. et al., "Learning a Gaussian Process Prior for Automatically Generating Music Playlists", Platt, John C. et al., "Learning a Gaussian Process Prior for Automatically Generating Music Playlists," Microsoft Corporation {platt, cburgess, sswenson, chriswea}@microsoft.com, alcez@cs.berkeley.edu, 2002; pp. 1-9, 2002, 1-9.

Platt, John S., "Fasting Embedding of Sparse Music Similarity Graphs", Platt, John S., "Fasting Embedding of Sparse Music Similarity Graphs," Microsoft Corporation, {jplatt@microsoft.com}; 2004.

Rauber, Andreas et al., "The SOM-enhanced JukeBox: Organization and visualization of Music Collections Based on Perceptual Models", Rauber, Andreas et al., The SOM-enhanced JukeBox: Organization and Visualization of Music Collections Based on Perceptual Models, Journal of New Music Research, vol. 32, Nov. 2, 2003, pp. 193-210, Nov. 2, 2003, 193-210.

Rudstrom, Asa, "Co-Construction of Hybrid Spaces", Co-Construction of Hybrid Spaces; Asa Rudstrom; A Dissertation submitted to the University of Stockholm in partial fulfillment of the requirements for the Degree of Doctor of Philosophy; Department of Computer and Systems Sciences Stockholm University and, Nov. 2005, 1-69.

Scheible, Jurgen et al., "MobiLenin—Combining a Multi-Track Music Video, Personal Mobile Phones and a Public Display into Multi-User Interactive Entertainment;", MobiLenin—Combining a Multi-Track Music Video, Personal Mobile Phones and a Public Display into Multi-User Interactive Entertainment; Jurgen Scheible, et al. Media Lab, University of Art and Design, Helsinki, Finland; pp. 1-10; Nov. 6-10, 2005, Nov. 2005, 1-10.

Scihira, I., "A Characterization of Singular Graphs", Scihira, I. "A Characterization of Singular Graphs". Electronic Journal of Linear Algebra, 16:451-462, 2007, 451-462.

Shneiderman, Ben, "Tree Visualization with Tree-Maps: 2-d Space-Filling Approach", Shneiderman, Ben, Tree Visualization with Tree-Maps: 2-d Space-Filling Approach, ACM Transactions on Graphics, vol. 11, No. 1, Jan. 1992, pp. 92-99, 1992, pp. 92-99.

Shneiderman, Ben, "Treemaps for Space-Contrained Visualization of Hierarchies", Shneiderman, Ben, Treemaps for Space-Contrained Visualization of Hierarchies, http://www.sc.umd.edu/heil/treemap-history, last updated Apr. 28, 2006, 16 pages, Apr. 28, 2006.

Smart Computing, "The Scoop on File-Sharing Services", Smart Computing, "The Scoop on File-Sharing Services," Dec. 2000, vol. 11, Issue 12; pp. 30-33 in printed issue. Available at www.smartcomputing.com/editorial/article.asp?article=articles%2F2000%Fs1112%2FOBs12.asp, Dec. 2000, 30-33.

Strands Business Solutions, "Integration Document v.2.0", Strands Business Solutions. "Integration Document v.2.0"; Published May 2008; [online retrieved on Jan. 21, 2010] Retrieved from the internet <URL:http://recommender.strands.com/doc/SBS-Integration-Document.pdf>; entire document—18 pages, May 2008.

Sun, Jimeng et al., "Incremental tensor analysis: theory and applications", Incremental tensor analysis: theory and applications, Jimeng Sun, Dacheng Tao, Spiros Papadimitriou, Philip Yu, Christos Faloutsos, ACM, Oct. 2008, pp. 1-37, Oct. 2008, 1-37.

Thompson, John, "A Graphic Representation of Interaction With the NEXIS News Database", John Thompson, "A Graphic Representation of Interaction With the NEXIS News Database," MIT Thesis (May 1983).

Tzanetakis, George et al., "A Prototype Audio Browser-Editor Using a Large Scale Immersive Visual and Audio Display", Tzanetakis, George et al., MARSYAS3D: A Prototype Audio Browser-Editor Using a Large Scale Immersive Visual and Audio Display, Proceedings of the 2001 International Conference on Auditory Display, Espoo, Finland, Jul./Aug. 2001, 5 pages, 2001.

Wolfers, Justin et al., "Prediction Markets", Wolfers, Justin and Zitzewitz, Eric, Prediction Markets, Journal of Economic Perspectives, Spring 2004, pp. 107-126, vol. 18, No. 2, 2004, 107-126.

Yates, Alexander et al., "ShopSmart; Product Recommendations through Technical Specifications and User Reviews", ShopSmart: Prodcut Recommendations through Technical Specifications and User Reviews; Alexander Yates et al. Temple University; CIKM; Oct. 26-30, 2008, Napa Valley, CA, USA; 2 pages, Oct. 2008.

Yen, Yi-Wyn, "Apple announces a 32GB iPhone 3G by Jun. 15, 2009", Yen, Yi-Wyn, Apple announces a 32GB iPhone 3G by Jun. 15, 2009, The Industry Standard, Apr. 2, 2009, http://wwww.thestandard.com/preditions/channel/hardware, downloaded Apr. 8, 2009, Apr. 2, 2009.

"iTunes sync is syncing the music playlist one way only for iPhone. How to fix it?", http://forums,ilounge.com/iphone/266172-itunes-sync-syncing-music-playlist-one-way-only-iphone-how-fix.htm, Jul. 25, 2011, pp. 1-3.

Olma, Alex: "Erfolgreich bei 'iTunes Match', angemeldet", http://www.iphoneblog.de/2011/09/16/erfolgreich-bei-itunes-match-angemeldet/, Sep. 16, 2011, pp. 1-2.

"Will iCloud sync which playlists I put purchased songs in?", https://discussions.apple.com/thread/3243465?start=0&tstart=0, Aug. 8, 2011, pp. 1-1.

* cited by examiner

MERGING PLAYLISTS FROM MULTIPLE SOURCES

CROSS REFERENCE TO RELATED APPLICATIONS

This application claims the benefit of U.S. Provisional Patent Application No. 61/542,375, entitled "MERGING PLAYLISTS FROM MULTIPLE SOURCES", filed on Oct. 3, 2011, and which is hereby expressly incorporated herein by reference in its entirety.

BACKGROUND

1. Technical Field

The present disclosure relates to merging multiple versions of a file and more specifically to heuristically determining whether to merge a playlist on a client device with a playlist on a server.

2. Introduction

The recent movement towards cloud storage with redundant storage on client devices has created a series of technical problems. One such problem is especially prevalent with respect to mobile devices, which often loose connectivity to the cloud. When a connection is reestablished conflicts can occur.

Solutions to handling version conflicts in distributed computing environments exist, however, distributed computing environments present a different set of problems and require different solutions. For example, in distributed computing environments multiple versions of documents most often come from two different people working on the same document at the same time. Systems for handling version conflicts in distributed computing environments can often use the fact that two different people have contributed to the same document to guide the rules by which versions are merged.

However, it is often the case that in a cloud locker environment single users are the most common genesis of version conflicts. For example, if a user stores their entire music catalog and playlists in cloud locker, and keeps a subset of their music catalog and playlists on their mobile device, it is possible that the user might modify one of the playlists and create a version conflict. Distributed computing solutions to the version conflict problem are not sufficient to solve the conflict because the assumptions on which those solutions are based do not apply. Accordingly there is a need to handle such version conflicts.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, devices, and non-transitory computer-readable storage media for resolving playlist version conflicts resulting from modifications made to a playlist version, stored on a client device and in a cloud locker, when the client device and the cloud locker are in a disconnected state. The present technology includes a heuristic for determining how to resolve such version conflicts.

In some embodiments a playlist is stored on a client device and a server in a cloud locker. Both the client device and cloud locker are associated with the same user account. When the client enters a disconnected state, such that changes made on the client device cannot be replicated substantially simultaneously in the cloud locker, the client device is configured to monitor all user-initiated changes on the client device.

Upon reconnection of the client and cloud locker, the server, associated with cloud locker attempts to reconcile any version discrepancies resulting from user-initiated changes. In one embodiment, when the server determines that one of the playlists on the client or server is a superset of the other, the superset is selected and saved to both the client and cloud locker, while the subset version is deleted. In embodiments wherein the client version and cloud locker version do not have a superset-subset relationship to one another, the client version is saved as a new version in the cloud locker.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for resolving version conflicts caused, at least in part, by irregularly connected devices operating a cloud locker environment.

In some embodiments, the present technology can be practiced using one or more computing devices. To facilitate the understanding of the present technology a general-purpose computing environment is illustrated in FIG. 1.

Figure 1:
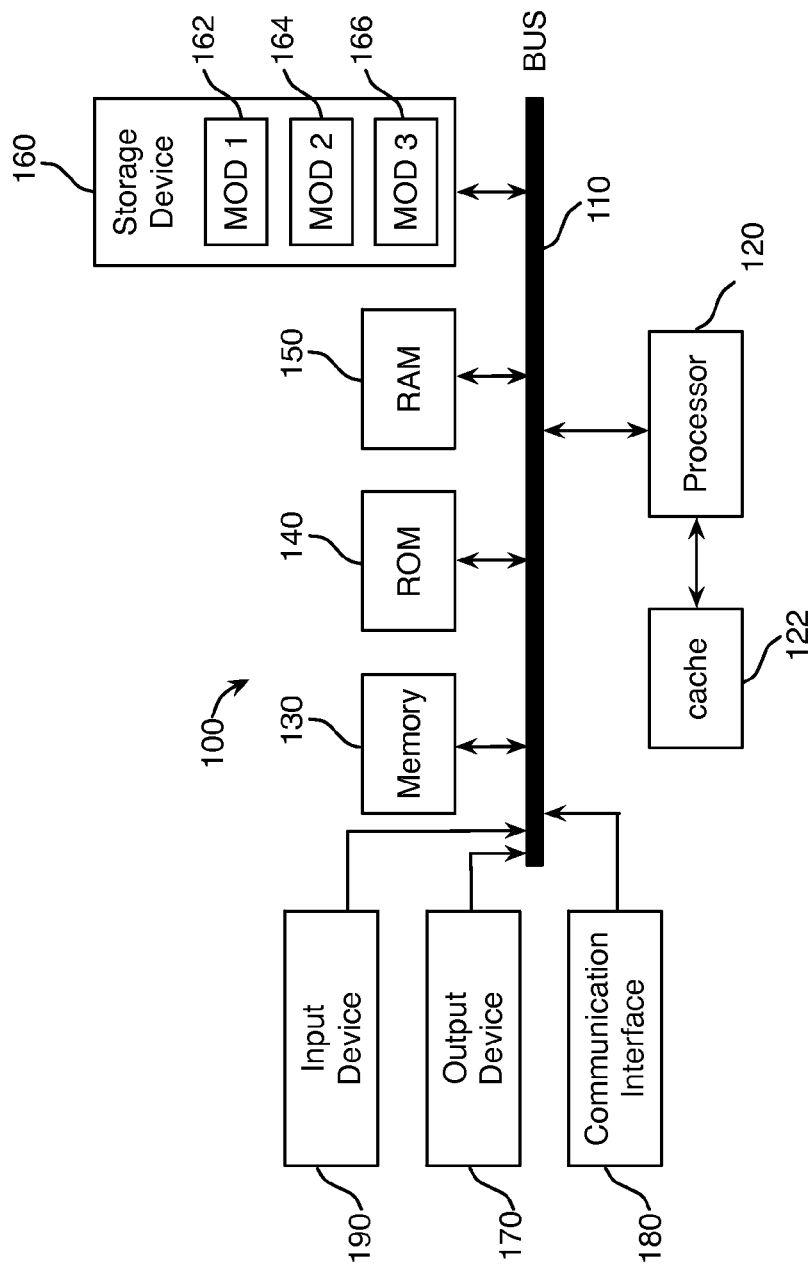
FIG. 1 illustrates an exemplary system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. In some embodiments, a chip set or system on a chip architecture can be used. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive, solid-state drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer; (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
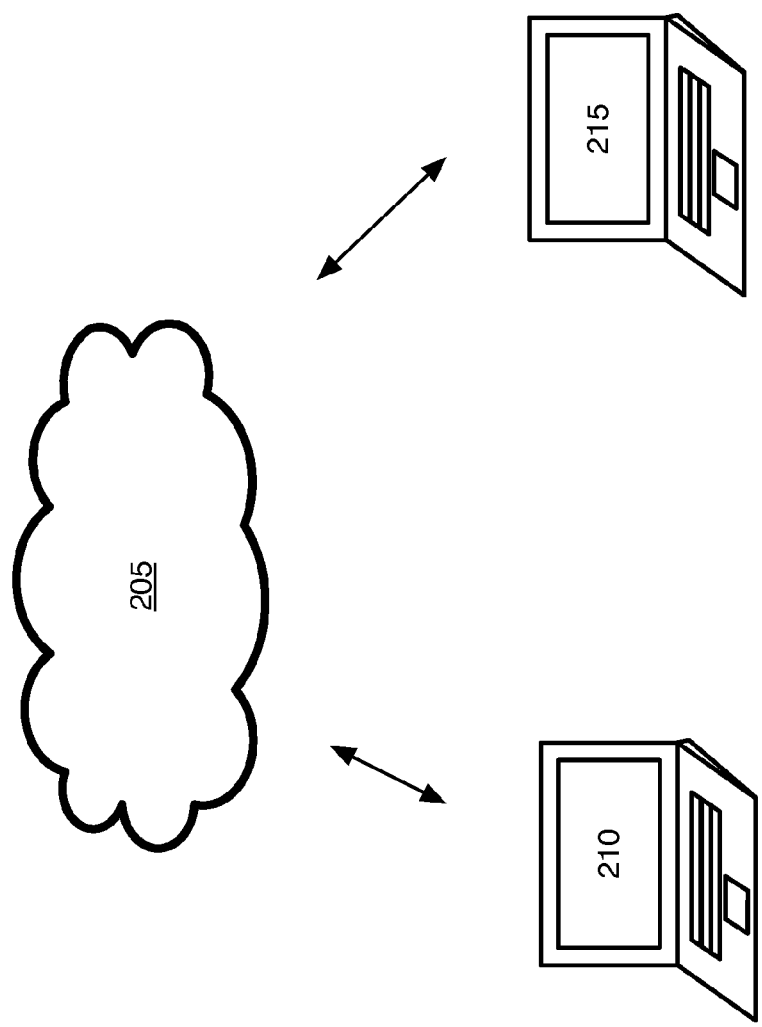
FIG. 2 illustrates an exemplary computing environment embodiment.

Having disclosed some components of a computing system, the disclosure now turns to FIG. 2, which illustrates an exemplary computing environment for the present technology. FIG. 2 illustrates a cloud locker environment wherein client devices 210, 215 are in electronic communication with cloud locker 205.

In some embodiments, cloud locker 205 is associated with an online store such as Apple Inc.'s ITUNES®. Clients 210, 215 can each be associated with a user account to the online store. In some embodiments both clients 210 and 215 are associated with the same user account to the online store.

Cloud locker 205 is configured to store the full contents of a media library associated with a user account, regardless of the origin of those contents, i.e., media stored in cloud locker 205 for a particular user account does not need to be purchased from an online store associated with cloud locker 205.

In many instances clients 210, 215 will only maintain a subset of media items from a media library associated the user's account. Clients 210 and 215 need not have the same media items stored thereon even when they are both associated with the same user account. In some embodiments a user can select media items to be locally stored on clients 210, 215, and in some embodiments a cloud locker algorithm can manage transfer of media items between cloud locker 205 and clients 210, 215 and further determine which media items should be locally stored on the clients. Local storage is most often redundant to cloud locker but facilitates faster access to media items and allows for access to media items even when clients 210, 215 become disconnect from cloud locker.

Clients 210, 215 are configured to access cloud locker to download or upload and even modify content stored by cloud locker 205.

As will be appreciated by those of ordinary skill in the art, the operating environment illustrated in FIG. 2 is prone to disconnection. This is especially true when clients are mobile phone devices, laptops, or tablet computers, but any client can potentially experience periods of disconnection. During disconnected states version conflicts of certain content can occur when a client device modifies a content item. FIGS. 3a-3d illustrate several exemplary version conflicts that can occur with respect to playlists of media items.

Figure 3A:
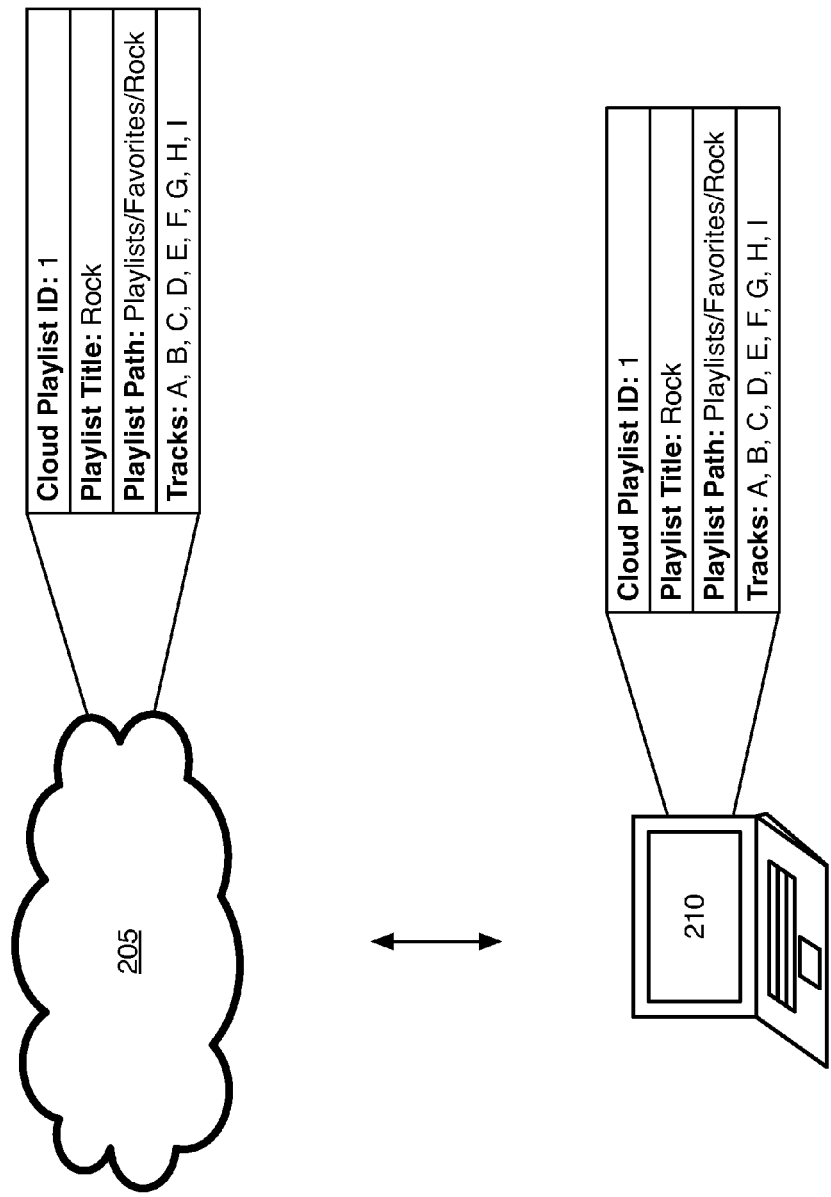
FIG. 3a illustrates a client device connected to a cloud locker system.

FIG. 3a illustrates client 210 and cloud locker 205 in a connected state. Cloud locker 205 is illustrated having a playlist associated with the music library of client device 210. Client device also has the same playlist accessible because it is connected to cloud locker 205. The playlist is characterized by a playlist ID, a title, a path within the music library, and a list of media tracks that make up the playlist.

The playlist ID is unique within a user account, and, as will become apparent in the description that follows, can be used to determine that a playlist stored in cloud locker 205 is the same or was the same as a playlist stored locally on client 210. The playlist path is also unique within a user account.

Figure 3B:
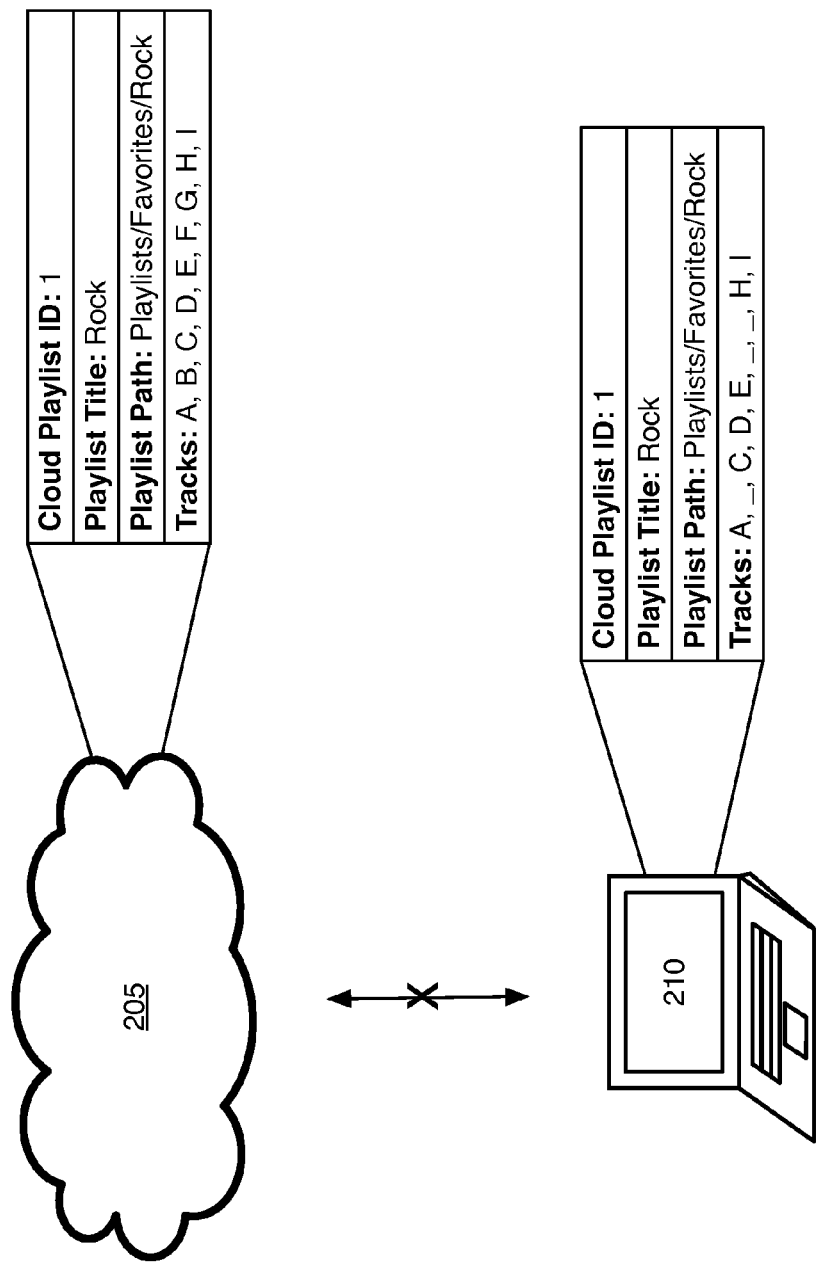
FIG. 3b illustrates the client device of FIG. 3a after becoming disconnected to the cloud locker system.

FIG. 3b illustrates cloud locker 205 and client device 210 in a disconnected state. Cloud locker 205 continues to have access to playlist ID 1 in an unaltered state from that illustrated in FIG. 3a, but client device 210 only has access to a subset of the tracks in the playlist. Namely, the playlist includes tracks A, B, C, D, E, F, G, H, and I, but the playlist on the client device 210 only includes tracks A, C, D, E, H, and I. Since client device 210 is disconnected from cloud locker 205 it only has access to those media items stored locally.

In this operating state illustrated in FIG. 3b, the playlist on client device 210 has only a subset of the tracks available to the same playlist stored on the server 205. The change in the contents of the playlist in the client device illustrated in FIG. 3a to the subset of contents on client device 210 illustrated in FIG. 3b is necessitated by the disconnection from the client device 210 from the cloud locker 205. Rather than maintain an incomplete version of the playlist, client device 210 compacts the playlist to only include the files available to the client device in its disconnected state.

While compacting the playlist is a practical step to take when client device 210 becomes disconnected from the cloud, it creates two different versions of a playlist, the cloud version and the client version. These versions create a need to determine if the user has made any changes to the playlist while the client has been disconnected from the cloud, and a need for a mechanism to reconcile the two different versions.

Figure 4:
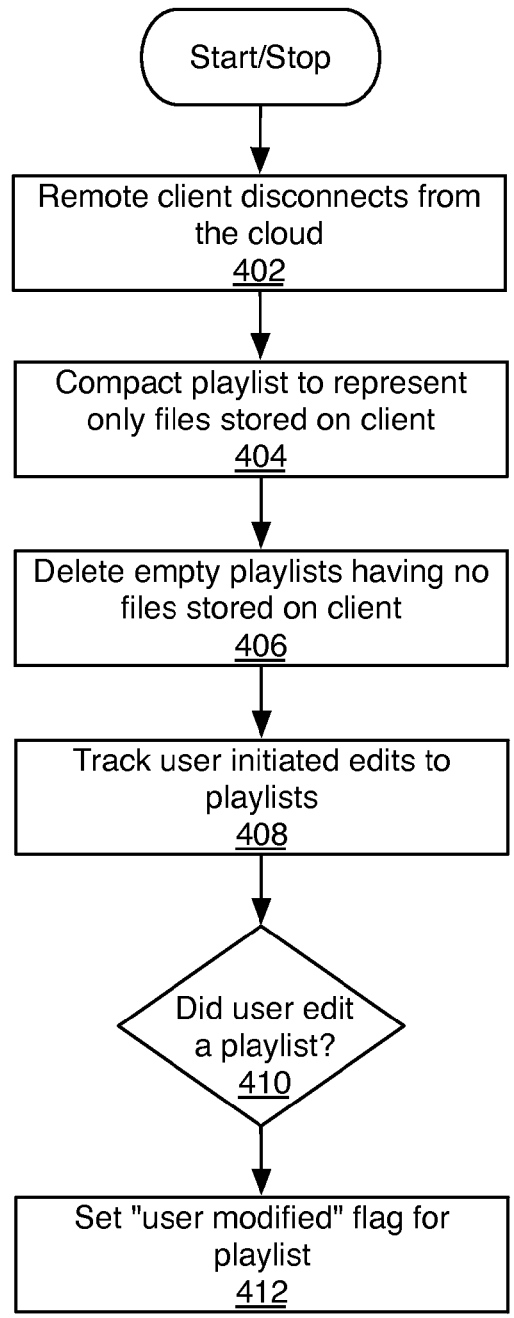
FIG. 4 illustrates an exemplary method embodiment for monitoring version conflicts during a disconnected state.

FIG. 4 illustrates a method executed by client device 210 that can be performed when the client device becomes disconnected from cloud. When the client disconnects from the cloud 402, the client device compacts the playlist to include only files that are locally available to the client 404. Some playlists might not have any songs because no files are locally available to the client (they are all stored in the cloud). These playlists can be deleted 406.

While client device 210 is disconnected from cloud locker 205 a user can make modifications to a playlist, but those modifications would not be reflected in the cloud due to the disconnected state of the client device 210. One solution to this problem is to track all user initiated edits 408. User initiated edits can be stored in a log file. Note that the compacting of playlists to remove files not stored on the client device 404 and the deletion of empty playlists 406 are not user actions, but are automatically performed by the client device 210.

If a user edits a playlist 410, the client device can set a "user modified" flag in association with the playlist 412.

Figure 5:
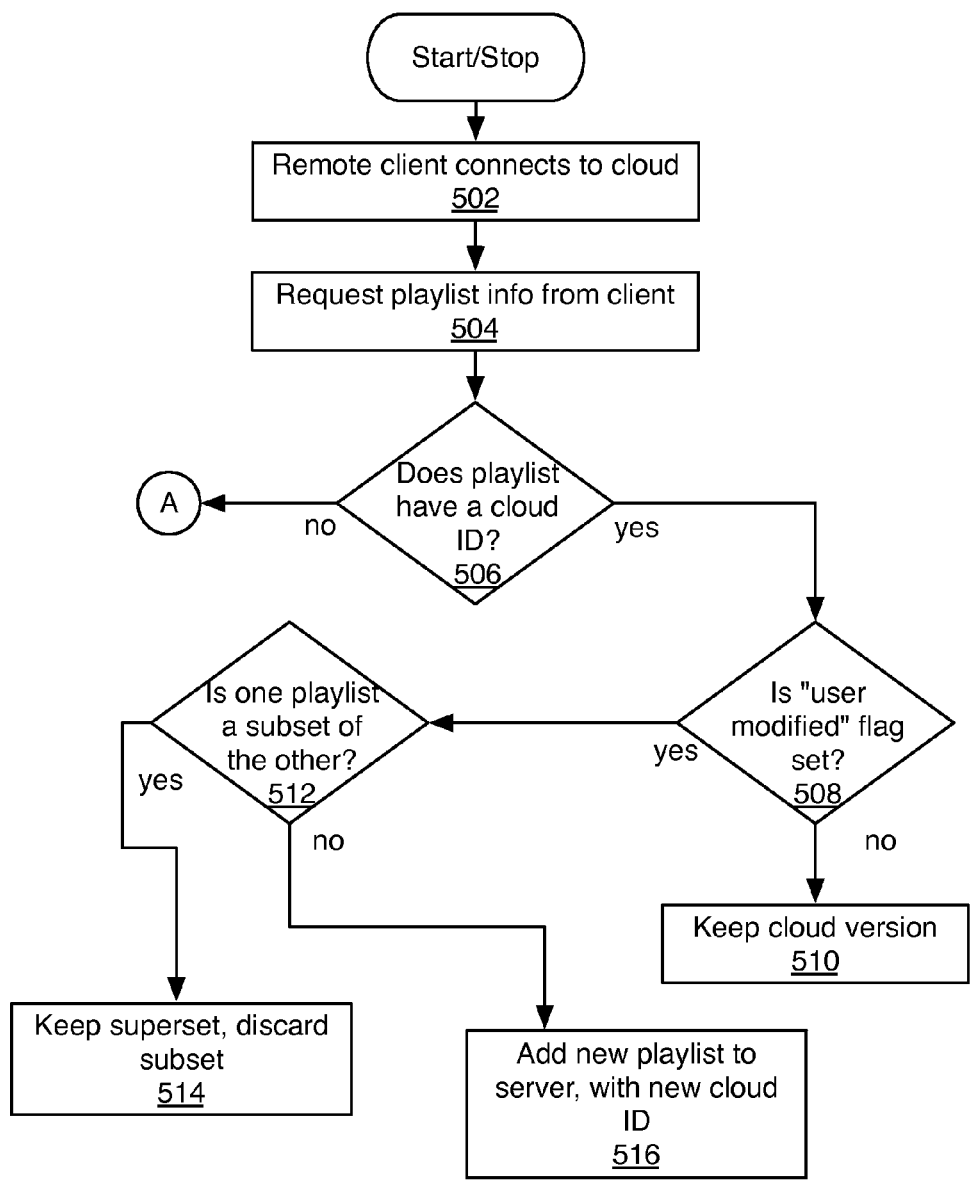
FIG. 5 illustrates an exemplary method embodiment for resolving a version conflict.

The method described with respect to FIG. 4 can be used to track whether a playlist has been modified during a disconnected interval and used to determine if conflicting versions of a playlist actually exist, or is the apparent conflict due only to a condensed version of a playlist. FIG. 5 illustrates a method for determining if a version conflict exists, and if so, how to reconcile a version conflict.

When the client 210 reconnects 502, cloud locker 205 requests playlist information from the client 504. The playlist information comprises one or more of a cloud playlist ID, playlist title, playlist path, a listing of tracks in the playlist, "user modified" flag information, and log file of user initiated changes, etc.

The cloud locker server receives the playlist information from the client and determines if the playlist has a cloud ID 506. If the playlist information includes a cloud playlist ID, it should correspond to a playlist also stored in cloud locker because the cloud playlist ID is originally assigned by the cloud locker server. If there is no cloud playlist ID, the playlist is likely to be either a new playlist or from a client that has never synched with the cloud locker, but is associated with the same user account. Embodiments wherein there is no cloud playlist ID are discussed in more detail with respect to FIG. 6.

When it is determined that a cloud playlist ID is included with the playlist information 506, cloud server determines if the "user modified flag" has been set 508. If the "user modified flag" has not been set, this indicates that any difference in the client device playlist and cloud locker playlist was due to the disconnected state and it is assumed that the user (of the user account) does not intend any changes that resulted purely as a result of the disconnected state to be made permanent, and cloud server keeps the cloud version 510, and replaces the client device copy with the cloud version.

However, if the "user modified" flag is set 508, it is likely that the user intended to change the playlist and would want those changes to be reflected in the cloud and an analysis of the cloud version and client version of the playlist is necessary to select which version of the playlist should be kept. Both playlist versions are compared and the cloud server attempts to determine if one playlist is a subset of the other 512.

Figure 3C:
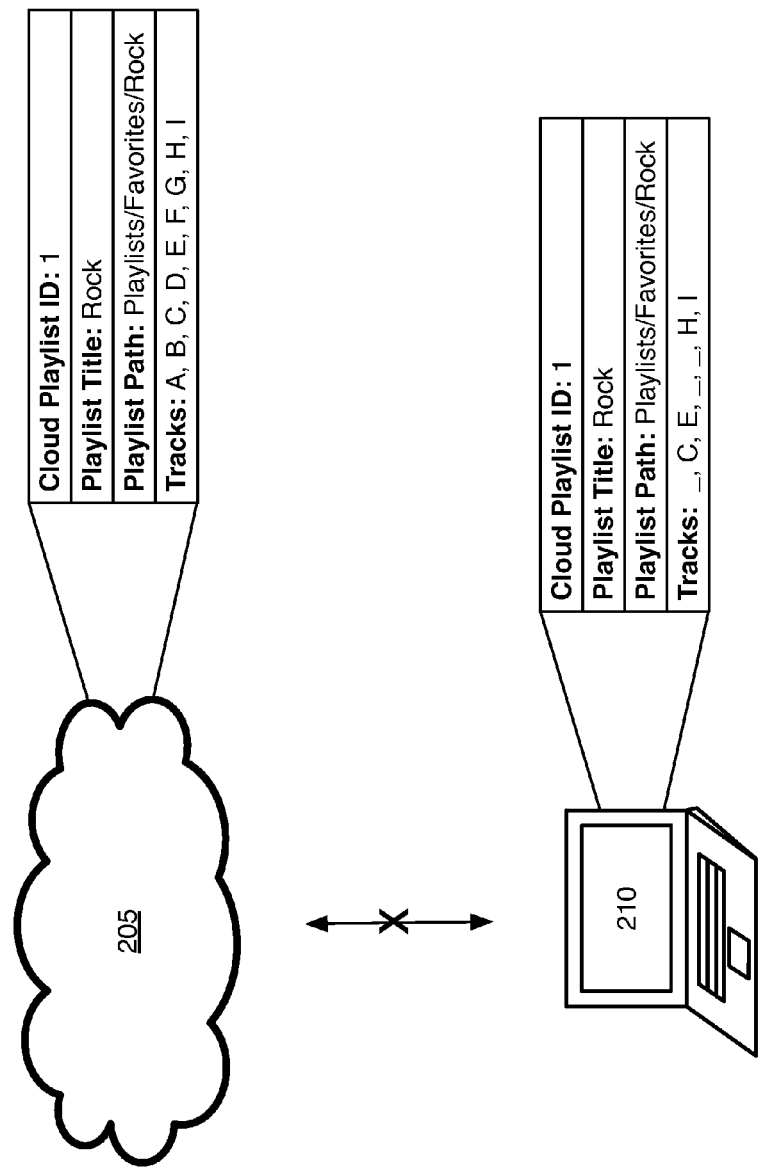
FIG. 3c illustrates an exemplary version conflict occurring during the disconnected state.

It can be assumed that if one playlist is a subset of the other that the user would intend to keep the superset, and thus the superset is kept as the cloud locker version 514 and the subset is discarded. This embodiment is illustrated in FIG. 3c wherein it is illustrated that the client device 210 is disconnected from cloud locker 205. FIG. 3c follows the instance illustrated in FIG. 3b wherein cloud locker has a playlist with an ID: 1, that has media items A, B, C, D, E, F, G, H, I, but due to the disconnected state client device 210 only has media items A, C, D, E, H, I stored thereon. FIG. 3c differs from FIG. 3b only in that the user has additionally modified playlist ID: 1 on the client device by deleting media item A. Since the playlist on the client device 210 is a subset of the playlist in cloud locker 205, the cloud locker version is retained, and the client version is replaced with the cloud locker version.

Figure 3D:
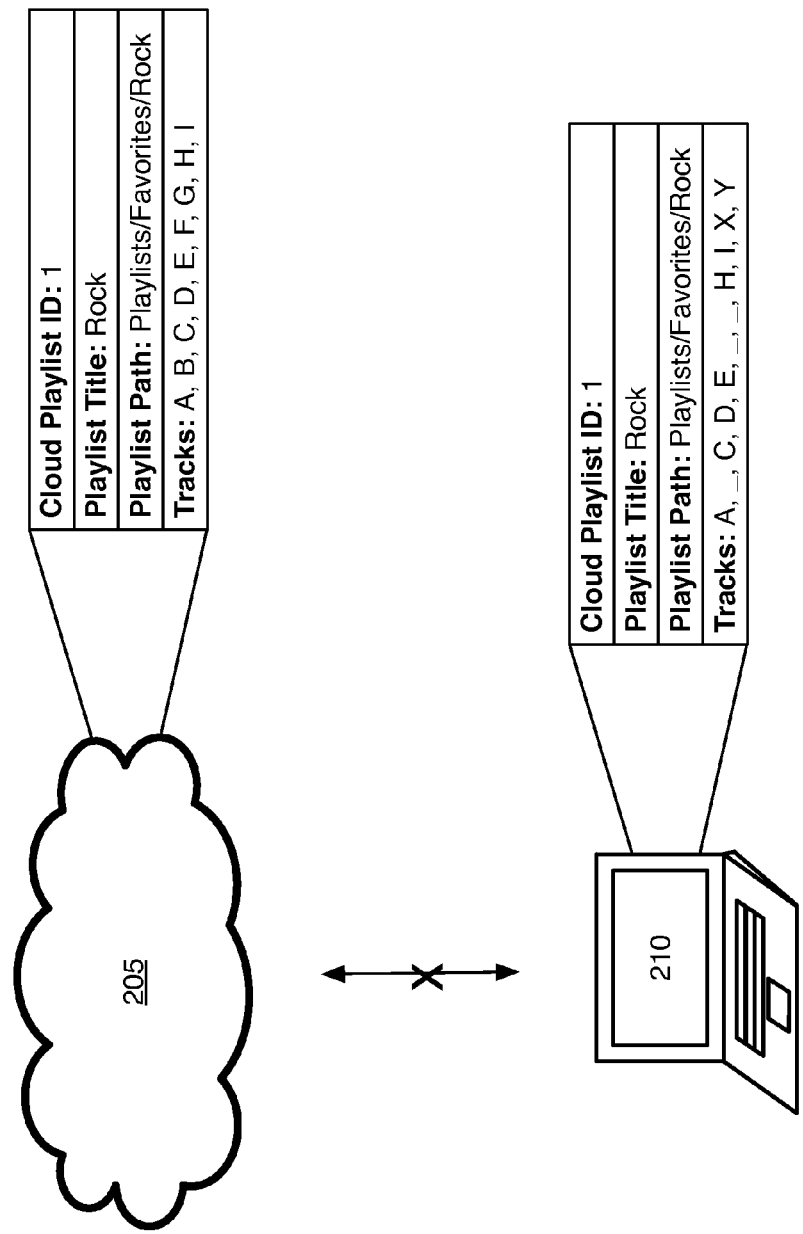
FIG. 3d illustrates an exemplary version conflict occurring during the disconnected state.

Using the same logic, it can be assumed that if the user added additional media items to the playlist, and that the superset playlist should be kept 514. FIG. 3d illustrates this scenario wherein the client device 210 is disconnected from cloud locker 205. FIG. 3d follows the instance illustrated in FIG. 3b wherein cloud locker has a playlist with an ID: 1, that has media items A, B, C, D, E, F, G, H, I, but due to the disconnected state client device 210 only has media items A, C, D, E, H, I stored thereon. FIG. 3d differs from FIG. 3b only in that the user has additionally modified playlist ID: 1 on the client device by adding media items X, and Y. Since the client device playlist, when restored to be able to access items in cloud locker B, F, and G, is the superset of the two playlist versions, the playlist on client 210 is retained 514 and replaces the cloud locker 205 version.

If, however, neither playlist is a subset of the other, 512, the playlist is considered to be a new playlist 516 and it is assigned a new cloud ID. Even though the two playlists that are compared 512 have matching playlist cloud IDs, which indicates that at one time the playlists were the same, the fact that neither playlist is a subset of the other indicates a substantial revision to the playlist, and it is assumed that the user intends to create a new playlist.

When a new cloud ID is assigned, the playlist can also be renamed or relocated. In some embodiments, the playlist title will be incremented in number, e.g. a "Rock" playlist can become "Rock 1" as the title of the new version. Alternatively the playlist can have the creating device's name appended to the playlist title, e.g. "Rock" playlist can become "Rock—MacBook Pro" as the title of the new version. The playlist can also be put into a new directory, such as a directory for playlists created on a user's MacBook Pro, and a directory for playlists created in the cloud.

In some embodiments, a subset is a true subset in that if any data including the playlist path, or title has changed the playlist can no longer be considered a subset even if the media items in the playlist represent a subset of its server/client counterpart.

In some embodiments, a subset includes a playlist with a variation in the order of the items in the playlist, even though both the server playlist and the client playlist include the same items. A subset can also be a true subset that also includes a variation in the ordering of the items.

While, in some embodiments a determination that one playlist is a subset of the other can be sensitive to order such that playlists having a subset of the same items, but arranged differently will not be considered a subset.

In some embodiments, a playlist will be considered a subset of its server/client counterpart if the media items in the playlist have a subset-superset relationship, even if title, path, or other identifying information does not.

In some embodiments, a user can modify title, path or other playlist identifying information without modifying the contents of the playlist. In such embodiments, the server can determine that the playlist has been modified by virtue of the "user modified" flag having been set, but further determine that the contents of the playlist on the client does not differ from the playlist on the cloud locker. Upon making this determination, the user modification can be applied to both playlists.

In some embodiments, when a client and cloud locker playlist are found to have the same cloud identifier, and one has been user modified as indicated by the "user modified" flag, the user modifications can be made to the unmodified playlist based on an analysis of the log of user initiated edits. For example, if the user has made less than a determined number of edits, the server can apply those edits to both versions of the playlist rather than replacing one version of the playlist with the other. It can be assumed that if only a few edits have been made that the user intended to edit the current playlist, but if a greater amount of edits have been made, then it can be assumed that the user intended to make an entirely new playlist.

In some embodiments, when a client and cloud locker playlist are found to have the same cloud identifier, and one has been user modified as indicated by the "user modified" flag, the user modifications can be made to the unmodified playlist based on an analysis of the log of user initiated edits. The nature of the edits can be determinative of whether the edits should be applied to the previous playlist versions or whether a new playlist should be created. For example, edits to the title or path might be indicative of a user's intent to create a new playlist, while minor modifications to playlist content might be indicative of an intention to modify the existing playlist.

Figure 6:
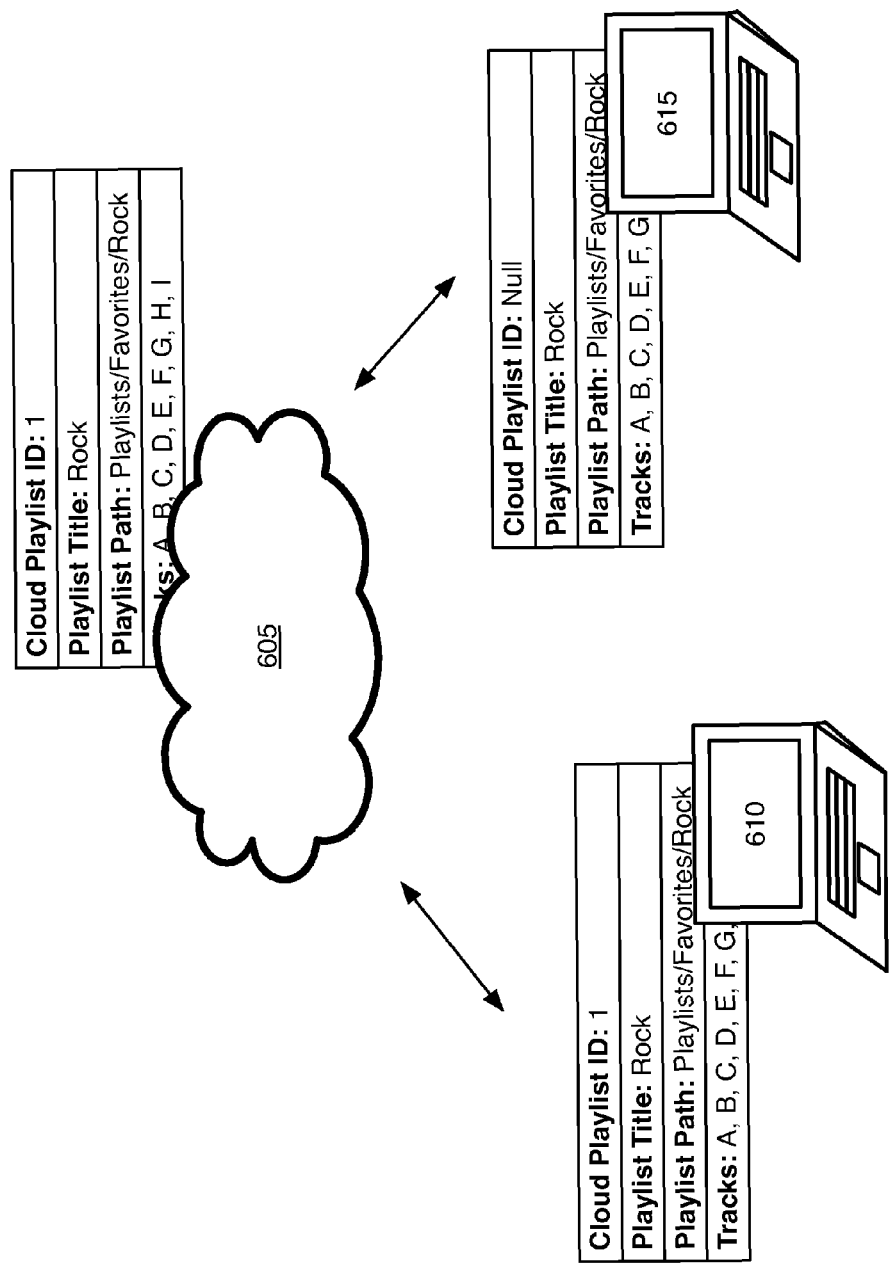
FIG. 6 exemplary illustrates an exemplary version conflict caused in part by multiple clients.

FIG. 6 illustrates an exemplary embodiment wherein two or more client devices 610, 615 (both substantially equivalent to 210) are both associated with the same user account. As illustrated, client device 610 has already been synched with cloud locker 605 (substantially equivalent to 205), and both client 610 and cloud locker 605 have the same playlist, playlist ID: 1, titled "Rock," at the same path "Playlists/Favorites/Rock," having tracks A, B, C, D, E, F, G, H, and I.

Figure 7:
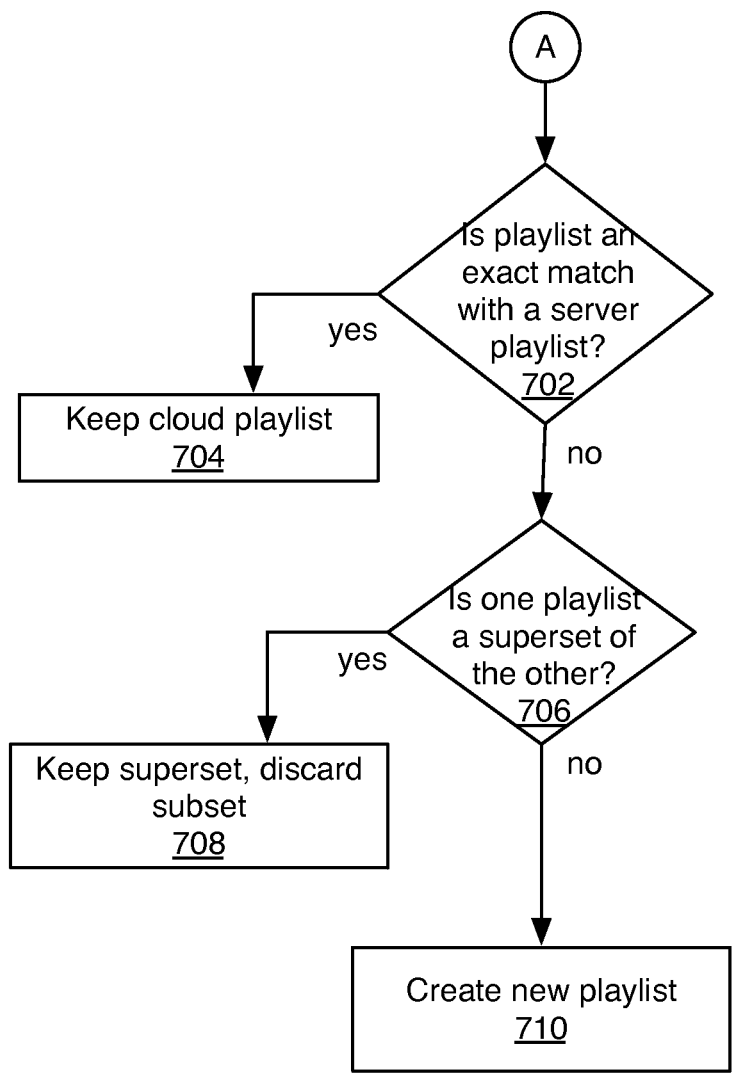
FIG. 7 illustrates an exemplary method embodiment for resolving a version conflict.

Client device 615 has not synched its playlist(s) with cloud locker 605 as indicated by the fact that the playlist on client device 615. In such embodiments, cloud locker 605 can attempt to determine if the playlist on client device 615 matches playlist(s) already on cloud locker 605. FIG. 7 illustrates an exemplary method for making this determination and handling un-synced playlists.

Cloud locker 605 first determines if the playlist on the client device 615 is an exact match with a playlist in the cloud locker 605. With respect to client device 615 in FIG. 6, it has a playlist that has not been assigned a cloud playlist ID, but has the same title, playlist path and tracks as cloud playlist ID: 1 on cloud locker 605. Thus at 702 the cloud locker server can determine that the playlists are an exact match, aside from the cloud playlist ID, and keeps the cloud playlist 704 and replaces or updates the playlist on the client device 615 to match the playlist on cloud locker 605.

If the playlists are not an exact match, the cloud server attempts to determine if one playlist is a superset of the other 706. If one is a superset, then the superset is kept and the subset is discarded 708. If neither playlist is a superset of the other, a new playlist is created 710 and stored in cloud locker 605.

While, in most instances changes are expect to occur at the client device, it is possible that changes will happen at the server while one client device has not been connected. Such changes can be replicated throughout all client devices based on the heuristics and rules described herein.

In some embodiments, the timing of changes can also be a factor in reconciling playlists on multiple client devices and cloud locker. For example in some embodiments, it will be the case that a user will modify a playlist on one client device and the modifications will be reconciled with the cloud locker. However, assuming a change is made on the server to remove media items from the playlist, thereby making a playlist in the cloud locker a subset of a disconnected client device, the rules discussed herein can be ignored and the server version can replace the corresponding version on other client devices based on the date of the modification.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
   detecting that a client device has established a reconnection between the client device and a cloud locker after an initial connection and disconnection between the client device and cloud locker, the client device and cloud locker being associated with a user account at a server;
   based on the reconnection, determining that a client playlist stored at the client device corresponds to a cloud playlist stored at the cloud locker, wherein the client playlist is determined to correspond to the cloud playlist based on a comparison of a client playlist identifier and a cloud playlist identifier, wherein the client playlist identifier and cloud playlist identifier respectively identify client and cloud playlists associated with the user account, wherein the client playlist is a compacted version of the cloud playlist comprising data locally stored on the client device for access by the client device during a disconnection between the client device and the cloud locker, the compacted version of the cloud playlist including data in the cloud playlist that is also locally stored on the client device and excluding a data item in the cloud playlist that is not locally stored on the client device, the data item being excluded in response to the disconnection;
   determining a conflict between the client playlist and the cloud playlist, the conflict indicating a user modification of the client playlist made during a disconnection between the client device and the cloud locker, the modification resulting in a modified client playlist comprising the compacted version of the cloud playlist and a newly-added data item; and
   resolving the conflict between the client playlist and the cloud playlist by instructing at least one of the client device and the cloud locker to store the modified client playlist with the newly-added data item and with the data item that had been removed based on the disconnection.

2. The method of claim 1, wherein determining that the client playlist corresponds to the cloud playlist is based on respective identifiers associated with playlist, the respective identifiers being equivalent.

3. The method of claim 1, wherein determining that the client playlist corresponds to the cloud playlist is based on respective names associated with each playlist, the respective names being the same.

4. The method of claim 1, wherein the modified client playlist comprises one of the client playlist or the cloud playlist and has a same content as a remaining set of the client playlist and the cloud playlist plus additional contents.

5. The method of claim 4, wherein the modified client playlist has a same relative ordering of its contents as a remaining set irrespective of additional contents that can be interspersed in the modified client playlist, the remaining set comprising one of the client playlist or the cloud playlist.

6. The method of claim 4, wherein the client playlist and the cloud playlist are named, and wherein the modified client playlist is further defined as having a same name as a remaining set comprising one of the client playlist or the cloud playlist.

7. The method of claim 4, wherein the client playlist and the cloud playlist have file paths, and wherein the modified client playlist is further defined as having a same file path as a remaining set comprising one of the client playlist or the cloud playlist.

8. A system comprising:
a processor;
a cloud locker; and
a computer-readable storage medium having stored therein instructions which, when executed by the processor, cause the processor to perform operations comprising:
receiving a request from a client device to reconcile a client playlist stored on the client device with a cloud playlist stored in the cloud locker, wherein the client playlist corresponds to the cloud playlist, and wherein the request is received after a reconnection of the client device to a network associated with the cloud locker, the client device and cloud locker being associated with a user account at an online store, wherein the client playlist is a compacted version of the cloud playlist comprising data locally stored on the client device for access by the client device during a disconnection between the client device and the cloud locker, the compacted version of the cloud playlist including data in the cloud playlist that is also locally stored on the client device and excluding a data item in the cloud playlist that is not locally stored on the client device, the data item being excluded in response to the disconnection;
determining a conflict between the client playlist and the cloud playlist, the conflict indicating a user modification of the client playlist made during a disconnection between the client device and the cloud locker, the modification resulting in a modified client playlist comprising the compacted version of the cloud playlist and a newly-added data item; and
resolving the conflict between the client playlist and the cloud playlist by instructing at least one of the client device and the cloud locker to store the modified client playlist with the newly-added data item and with the data item that had been removed based on the disconnection.

9. The system of claim 8, wherein the client playlist and the cloud playlist have respective identifiers that are equivalent.

10. The system of claim 8, wherein the client playlist and the cloud playlist have respective names that are equivalent.

11. The system of claim 8, wherein the modified client playlist comprises one of the client playlist and the cloud playlist that contains a same content as a remaining set plus additional contents, the remaining set comprising one of the client playlist or the cloud playlist.

12. The system of claim 11, wherein the modified client playlist has a same relative ordering of its contents as a remaining set irrespective of additional contents that can be interspersed in the modified client playlist, the remaining set comprising one of the client playlist or the cloud playlist.

13. A non-transitory computer-readable storage medium storing instructions which, when executed by a processor, cause the processor to perform operations comprising:
detecting that a client device has established a reconnection between the client device and a remote locker after an initial connection and disconnection between the client device and remote locker, the client device and remote locker being associated with a user account at a server;
based on the reconnection, determining that a client playlist stored at the client device corresponds to a remote playlist stored at the remote locker, wherein the client playlist and the remote playlist are associated with a user account at an online store, wherein the client playlist is a compacted version of the remote playlist comprising data locally stored on the client device for access by the client device during a disconnection between the client device and the remote locker, the compacted version of the remote playlist including data in the remote playlist that is also locally stored on the client device and excluding a data item in the remote playlist that is not locally stored on the client device, the data item being excluded in response to the disconnection;
determining a conflict between the client playlist and the remote playlist, the conflict indicating a user modification of the client playlist made during a disconnection between the client device and the remote locker, the modification resulting in a modified client playlist comprising the compacted version of the remote playlist and a newly-added data item; and
resolving the conflict between the client playlist and the cloud playlist by instructing at least one of the client device and the remote locker to store the modified client playlist with the newly-added data item and with the data item that had been removed based on the disconnection.

14. The non-transitory computer-readable storage medium of claim 13, wherein the client playlist and the remote playlist are playlists.

15. The non-transitory computer-readable storage medium of claim 13, wherein determining that the client playlist corresponds to the remote playlist is based on respective identifiers associated with each set of data, the respective identifiers being equivalent.

16. The non-transitory computer-readable storage medium of claim 13, wherein determining that the client playlist corresponds to the remote playlist is based on respective names associated with each set of data, the respective names being the same.

17. The non-transitory computer-readable storage medium of claim 13, wherein the modified client playlist comprises one of the client playlist or the remote playlist and has a same content as a remaining set plus additional contents, the remaining set comprising one of the client playlist or the remote playlist.

18. The non-transitory computer-readable storage medium of claim 17, wherein the modified client playlist has a same relative ordering of its contents as a remaining set irrespective of the additional contents that can be interspersed in the modified client playlist, the remaining set comprising one of the client playlist or the remote playlist.

19. The non-transitory computer-readable storage medium of claim 17, wherein the client playlist and the remote playlist are named, and wherein the modified client playlist is further defined as having a same name as a remaining set comprising one of the client playlist or the remote playlist.

20. The non-transitory computer-readable storage medium of claim 17, wherein the client playlist and the remote playlist have file paths, and wherein the modified client playlist is further defined as having a same file path as a remaining set comprising one of the client playlist or the remote playlist.

* * * * *